United States Patent [19]

Gilby

[11] 4,382,656
[45] May 10, 1983

[54] NON-IMAGING OPTICAL ENERGY TRANSFER SYSTEM

[75] Inventor: Anthony C. Gilby, Foxboro, Mass.

[73] Assignee: The Foxboro Company, Foxboro, Mass.

[21] Appl. No.: 206,249

[22] Filed: Nov. 12, 1980

[51] Int. Cl.³ .............................................. G02B 5/14
[52] U.S. Cl. .............................. 350/96.28; 350/96.10; 350/320; 356/326
[58] Field of Search ............... 250/343; 350/55, 96.10, 350/96.28, 320; 356/326

[56] References Cited

U.S. PATENT DOCUMENTS

| | | | |
|---|---|---|---|
| 3,535,507 | 10/1970 | Sugino | 350/96.10 X |
| 3,536,434 | 10/1970 | Frank | 350/96.28 X |
| 3,670,157 | 6/1972 | Bragg | 350/96.28 X |
| 3,861,809 | 1/1975 | Hall, Jr. | 250/343 X |
| 4,070,090 | 1/1978 | Farr et al. | 350/96.28 X |
| 4,105,332 | 8/1978 | Hohne et al. | 350/96.28 X |
| 4,175,864 | 11/1979 | Gilby | 356/326 |

OTHER PUBLICATIONS

Williamson, "Cone Channel Condenser Optics," *J.O.S.A.*, vol. 42, No. 10, Oct. 1952, pp. 712–715.
Marshall, "Tapered Light Guide Condenser: A Design Approach," *Conf. Proc. of SPIE Vol. 176 Guided Wave Opt. Systems & Devices II*, Washington, D.C., Apr. 1979, pp. 161–167.

*Primary Examiner*—John D. Lee
*Attorney, Agent, or Firm*—Andrew T. Karnakis

[57] ABSTRACT

A non-imaging optical energy transfer system includes a tapered light pipe and associated field lens as its central energy transfer mechanism. The light pipe/lens combination is located between two separate sections of the system which individually have the same throughput or etendue but otherwise differ in f/#, beam focus, and pupil sizes. The transfer system is disclosed used in combination with a circular variable filter-absorption cell infrared spectrometer and an internal reflection spectrometer, employing a multiple internal reflection crystal.

20 Claims, 6 Drawing Figures

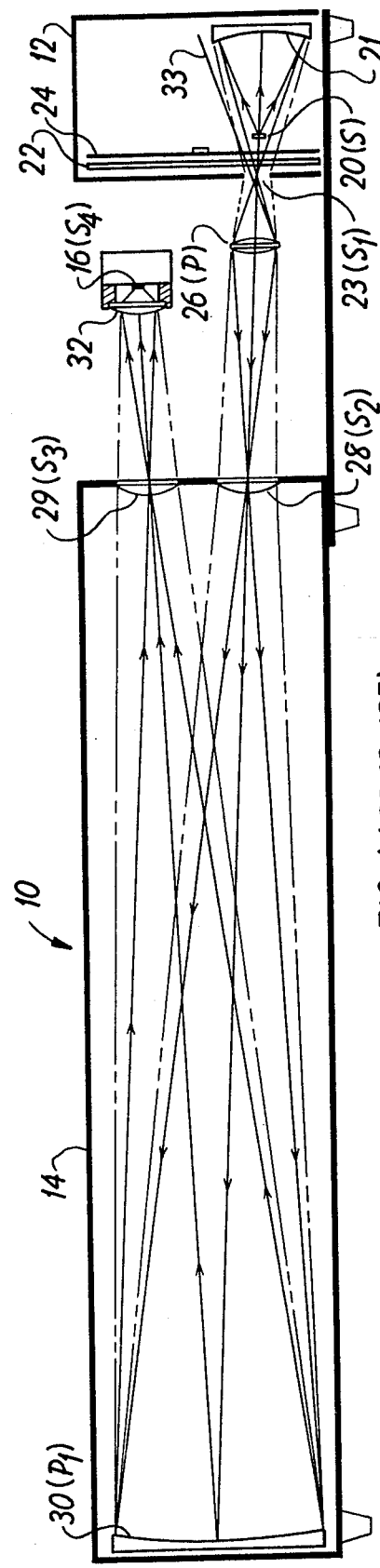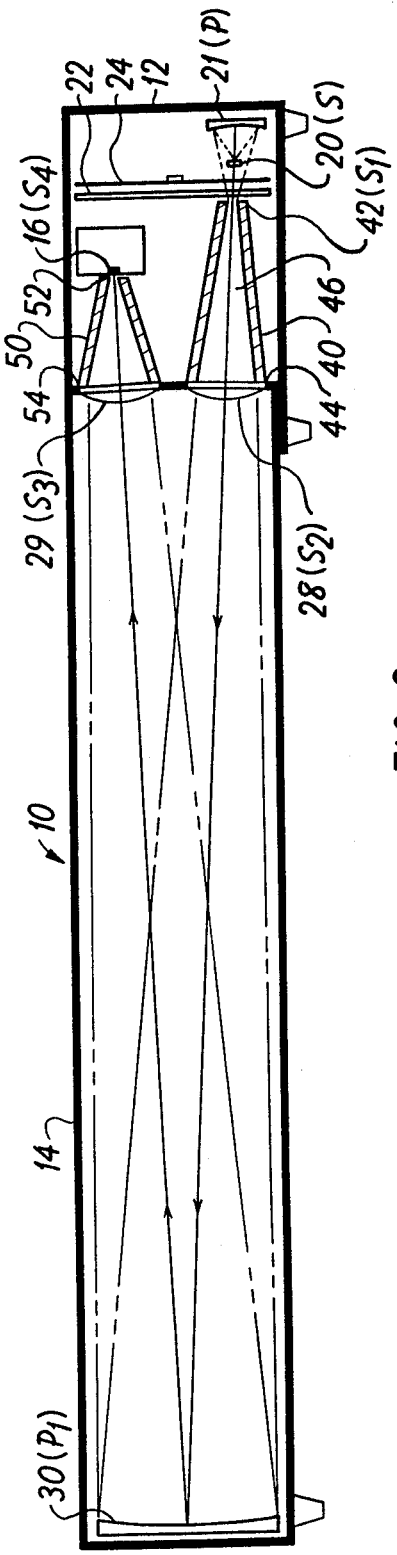
FIG. 1 (PRIOR ART)
FIG. 2

NON-IMAGING OPTICAL ENERGY TRANSFER SYSTEM

FIELD OF THE INVENTION

This invention relates generally to optical systems and particularly to such systems employed in instruments which involve the transfer of optical energy between spatially distinct locations.

BACKGROUND OF THE INVENTION

Optical energy transfer systems that combine a series of lenses and mirrors have been known for many years, and in fact such systems have played a major role in the commercial development of certain analytical instrumentation. An example of such an instrument is a spectrometer which passes a light beam through a sample cell to measure the absorption spectrum of an unknown gas in a predetermined wavelength region.

Two important characteristics of the types of optical system described herein are that they must be capable of changing the f/# of the beam as it traverses the system while at the same time substantially matching the etendue or optical throughput from one part of the instrument system to another to avoid energy loss through vignetting. This is especially significant in today's commercial optical instruments where limitations of size and cost result in widely varying optical requirements between spatially distinct locations within the instrument.

In the particular example of an infrared spectrometer, it is desirable to obtain the highest signal level from the available source power by passing as much infrared energy as possible into the system through the monochromator slit. Therefore, an input beam with as large a solid angle as possible that does not sacrifice spectral resolution (e.g., f/1.5 for a circular variable filter based spectrometer) is used to form the first image (beam focus) of the source at the slit. The divergence of the beam as it traverses the cell is however more severely limited due to optical aberrations and practical size requirements of the absorption cell itself and the associated optics. Typically, the beam passing into and out of the cell is f/4.5.

The product of the area of the slit and the solid angle of the beam at the slit establishes the optical throughput or etendue of the spectrometer system. For best instrument performance, the etendue in other sections of the system, such as the absorption cell, should be the same such that energy throughput is maximized even though the f/# requirements may vary widely. To minimize vignetting energy losses, pupil dimensions defined in respective sections should be preserved while the substantially different solid angles of the beams in various sections of the device are simultaneously matched.

Optical energy transfer systems of the prior art present certain drawbacks. Particularly when very wide angle or "fast" beams are involved, a conventional lens/mirror system requires strong (i.e., short focal length) lenses to produce a desired f/# change with minimal vignetting. However, such lenses produce aberrations and Fresnel reflections and thus are themselves sources of lost energy for the system. Further these lenses are space-consuming and field lenses as well as focusing lenses are required to achieve the desired result, all of which adds to the overall size and weight of the instrument system.

SUMMARY OF THE INVENTION

The present invention overcomes the disadvantages and limitations of the prior art by providing a tapered light pipe and associated field lens as the "central" energy transfer mechanism in a non-imaging optical energy transfer system. The tapered light pipe is considered to be at the center of the optical system because it matches at its end beams having different f/# requirements as energy is transferred from one section of the system to another. Coincident with transferring beam foci, the tapered light pipe/lens combination matches pupils in the small end section to pupils in the large end section.

In a preferred embodiment of the invention to be subsequently disclosed in detail, an infrared spectrometer utilizes a tapered light pipe of rectangular cross section as one element of the optical connecting link between the source of monochromatic infrared energy and the sample absorption cell. A beam focus of the source is produced through a fast beam at the small end opening of the light pipe which serves as the filter defining slit. The beam exiting the large end of the pipe is sufficiently reduced in solid angle to match the optical requirements of the cell which essentially are preestablished by the area of the cell's limiting pupil (object mirror), the area of the beam focus which is at the large end of the pipe and the separation between them. These quantities establish the etendue of the absorption cell. The etendue of the source/monochromator section is designed to be the same.

The limiting pupil is simultaneously transferred onto the other side of the light pipe by a second optical element—namely a field lens adjacent the large end of the pipe. The lens in combination with the correctly chosen taper of the light pipe provides for substantially total energy transfer between pupils thereby maintaining the etendue through the system. Additionally the use of a tapered light pipe eliminates the function of two relatively strong lenses (or equivalent mirrors) in a comparable lens/mirror design. This permits a more simplified, compact construction which aids in the design of a portable instrument.

DESCRIPTION OF THE DRAWINGS

Other aspects and advantages of the present invention will be best understood by the following detailed description taken in accordance with the following drawings wherein:

FIG. 1 is an optical schematic of a prior art optical energy transfer system used in combination with a spectrometer;

FIG. 2 is an optical schematic of the preferred embodiment of an optical energy transfer system constructed in accordance with the present invention also used in combination with a spectrometer;

DESCRIPTION OF THE PREFERRED EMBODIMENT

Figure 3:
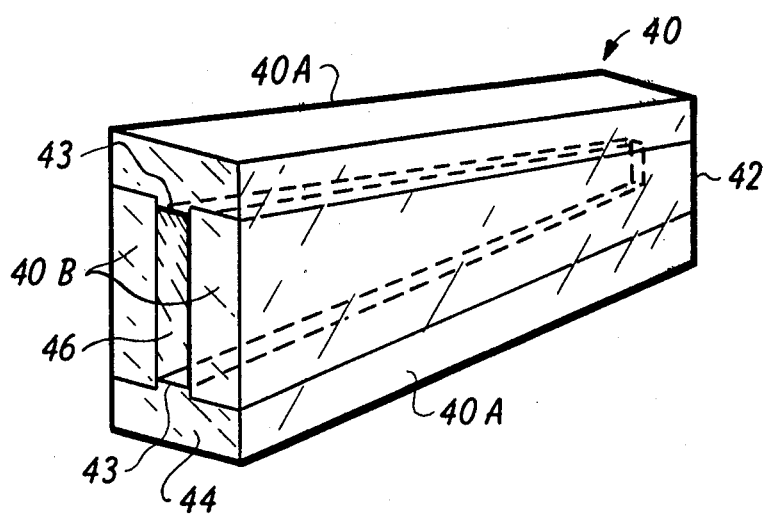
FIG. 3 is a perspective view of a tapered light pipe for the embodiment of FIG. 2.

In order to obtain a clearer understanding of the construction and operation of the present invention, an explanation of prior art optical energy transfer systems used in combination with spectrometers will be helpful. Referring to FIG. 1, there is shown in schematic form a conventional infrared spectrometer 10 which is made up of three major assemblies, an instrument head 12, a sample absorption cell 14, and a pyroelectric detector 16. The optical transfer system of the spectrometer transcends all three assemblies.

The head 12 has contained therein a light source 20, a source mirror 21, and circular variable filter 22, which produce a first image $S_1$ of the source of appropriate infrared wavelength at a rectangular exit slit 23. Also depicted is the usual rotating chopper 24 which breaks the continuous beam into a series of pulses to enable the detector and associated signal processing system to respond to changes in energy reaching it while at the same time rejecting much of the electrical noise in the system.

Intermediate the head and sample cell, a silver bromide focusing lens 26 is positioned to produce a second image $S_2$ of the source at an entrance window 28 of the sample cell. The entrance window is actually a field lens which propagates an image P of an object mirror 30 placed at the far end of the cell onto the focusing lens such that the objective mirror is fully illuminated by the beam emerging from the entrance window. The object mirror is the limiting pupil $P_1$ of the sample cell and together with the associated beam focus at the cell entrance window defines the etendue of the complete optical system.

The object mirror 30 then reflects the beam onto the cell exit window 29 where a third image $S_3$ of the source is produced. The beam passing out of the cell 14 is ultimately directed onto a detector lens 32 for producing a fourth source image $S_4$ at the detector 16. The response produced by this image is then processed according to well known techniques to provide a spectral analysis of the sample gas contained in the cell.

The beam entering and exiting the cell 14 is of substantially higher f/# (e.g., f/4.5) than that of the beam focused through the slit 23 (e.g., f/1.5). In this instance beam angle matching for energy transfer is accomplished by the focusing lens 26. As shown the lens 26 has a very short focal length and as such is subject to chromatic and other aberrations as well as surface reflections, all of which result in lost energy to the system and a corresponding poorer signal-to-noise ratio for a given power input.

It is also apparent that despite the fact that the image P of the limiting pupil $P_1$ is propagated out of the cell 14 by means of the field lens 28 onto the focusing lens 26, the pupil image is not transferred to the input section (i.e., instrument head 12) of the device as evidenced by the back-projected extreme ray 33 which does not impinge on the source mirror. Hence numerous rays are lost to the transfer system. Absent another field lens positioned at the slit 23 or substantially increasing the size of the source mirror 21, optical throughput has been lost. It is not practical to eliminate this undesirable vignetting by taking such steps because the very short focal lengths of the optical components involved would produce other more severe losses.

Turning now to FIG. 2, a more complete understanding of the optical energy transfer system of the present invention will become apparent. FIG. 2 also shows the system used in combination with a spectrometer and to particularly emphasize certain advantages of the present transfer system both spectrometers are configured with sample absorption cells of identical length, with the dimensions of the remainder of the instrument being scaled to that length. Attention is particularly directed to the portion of the beam from the chopper/filter network up to the cell entrance window 28. The remainder of the device, with the exception of the detector optics which will be subsequently described, is identical to that discussed above and for ease in comparison like reference numerals have been retained between the two figures. Accordingly, no further explanation of these components is deemed necessary.

As shown in FIG. 2, a tapered light pipe 40 is positioned in the optical beam path between the head 12 and the absorption cell 14. Tapered light pipes of various configurations have been used for some time now as energy collectors or concentrators, most often with the large end accepting light rays from a source and focusing through internal reflections within the pipe the optical energy onto a detector positioned directly at the small end. Further details on the properties and construction of such tapered light pipes may be had by reference to an article entitled "Cone Channel Condenser Optics" by D. E. Williamson published in the Journal of the Optical Society of America, Vol. 42 No. 10, October 1952. Thus, what Williams and others propose regarding tapered light pipes was that they were useful as one termination point of the optical system and not as part of an energy transfer mechanism. However, in the present embodiment, the light pipe, which has a hollow inner channel 46 of rectangular cross-section (see FIG. 3), forms a closed channel in the center of the optical system with its small end 42 coincident with a beam focus in the head and its large end 44 being at the beam focus of the cell. Specifically, the small end of the pipe protrudes up to and nearly touches the filter 22, so as to positionally coincide with a beam focus (source image $S_1$). Additionally the area of the small end opening matches the cross-section of this beam focus and thus serves as the filter defining slit. Meanwhile the large end butts against the cell entrance window/field lens 28, which is also a beam focus of cross-sectional area identical to that of the large end opening.

After passing through the absorption cell 14 and reflecting from the object mirror 30, the beam is directed to the cell exit window 29 which concentrates the rays on a second tapered light pipe 50 located with its large end 54 covering the exit window. This light pipe is of similar construction to the light pipe 40 but because of the shorter distance between the exit window and the detector 16 it has a more severe taper. It should also be mentioned that the detector is positioned directly at the small end 52 of the pipe. Hence this tapered light pipe functions as an energy collector of the type mentioned above and explained in considerable detail in the aforementioned Williamson article.

A comparison of FIGS. 1 and 2 shows, aside from the elimination of strong focusing lenses, that it is possible to shorten the distance between the head 12 and the cell 14. Such compact dimensions not only enhance the design of portable instrumentation but also reduce atmospheric interference by providing shorter optical beam paths external to the absorption cell. While at the same time linear dimensions are decreased, the present invention has the further advantage, as will be more fully explained below, of maximizing energy transfer between the source 20 and the absorption cell.

FIG. 3 shows the details of the construction of the tapered light pipe 40. The pipe is made from four pieces of ¼" thick clear thermoplastic, two identical top and bottom pieces 40A and two correspondingly identical tapered sidewall pieces 40B. The top and bottom pieces have a centrally located tongue 43 that extends along the entire length of the piece and which is adapted to matingly position the tapered sidewalls such that when assembled the hollow inner channel 46 is formed and the exterior surfaces of the pipe present a smooth contour. The inner walls of the four pieces that define the channel are gold coated to reduce reflection losses thereby enhancing the efficient transfer of energy through the pipe. The ratio of the heights of the openings at both ends to the respective widths, which defines the magnification M and accordingly the amount of f/# variability achievable by the pipe, is kept constant. In this embodiment the opening at the large end 44 is 20 mm×5 mm with the opening at the small end 42 measuring 5 mm×1.25 mm such that M=4. Therefore, the light pipe accepts an f/1.5 beam and produced a four-fold increase in f/# transforming the beam at the large end to f/6.

Figure 4:
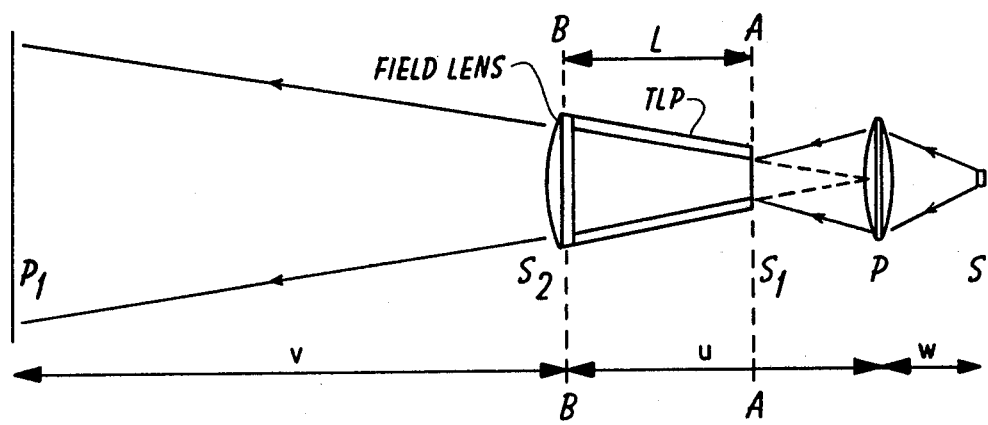
FIG. 4 is a diagrammatic representation of the optical energy transfer system of the present invention illustrating construction techniques for a tapered light pipe/lens combination to achieve maximum optical throughput.

FIG. 4 illustrates in diagrammatic form constructional techniques for applying a tapered light pipe and field lens combination to an optical energy transfer system so as to match the optical Lagrangian and etendue parameters of the system. This maximizes energy transfer throughout the system and avoids undesirable beam spreading as well. The diagram shows a tapered light pipe (TLP) and field lens positioned in the center of the transfer system between a beam focus $S_1$ and pupil P to the right of dashed lines A-A (the TLP small end section) and a beam focus $S_2$ and pupil $P_1$ to the left of dashed lines B-B (the TLP large end section of the system). The separation between and size of optical components is included on the diagram. The areas of beam foci and pupils (e.g., $A_S$, $A_P$, etc.) are used for establishing the etendue of the system. Since the separation between beam focus and pupil is different in the two sections, the f/# requirements in each section will also differ. (It should be noted that although image properties of the focus are not transferred through the system due to the scrambling of rays by the TLP the energy flux concentration aspect is retained to produce the desired beam focus.)

The etendue (E) for the system is established by the amount of energy available from the source that enters the system via the beam focus at the small end of the TLP and is given by the expression:

$$E_{SES} = \frac{A_{S1} \cdot A_P}{(u-L)^2} = \frac{A_S \cdot A_P}{w^2} \quad (1)$$

where $E_{SES}$ represents the etendue of the small end section and the corresponding distances are as defined in FIG. 4.

If it is assumed that the large end section of the system includes geometrical and/or optical constraints (e.g., $P_1$ is a limiting pupil of the system), then, for best performance, the optical system should form a conjugate pupil in this section which is coincident with the pupil P in the small end section. Considering first the case where the field lens along is in the position shown and the TLP is absent from the system, it is apparent that an image of the pupil $P_1$ will be formed at P and consequently that $$\frac{A_{S2} \cdot A_P}{u^2} = \frac{A_{S2} \cdot A_{P1}}{v^2} \quad (2)$$

where by definition the term $$\frac{A_{S2} \cdot A_{P1}}{v^2}$$

represents the etendue of the large end section ($E_{LES}$).

If the TLP is chosen such that its vertex (i.e., the point where the sides of the light pipe, if extended, would meet) is placed in the plane of P, it follows that $$\frac{A_{S2}}{A_{S1}} = \frac{u^2}{(u-L)^2} \text{ or by rearranging } \frac{A_{S2}}{u^2} = \frac{A_{S1}}{(u-L)^2} \quad (3)$$

Combining equations (2) and (3) yields the following:

$$E_{LES} = \frac{A_{S1} \cdot A_P}{(u-L)^2} = E_{SES} \quad (4)$$

Therefore, energy will be transmitted to $P_1$ substantially without vignetting and the etendue has been matched throughout the various sections of the transfer system.

Figure 5:
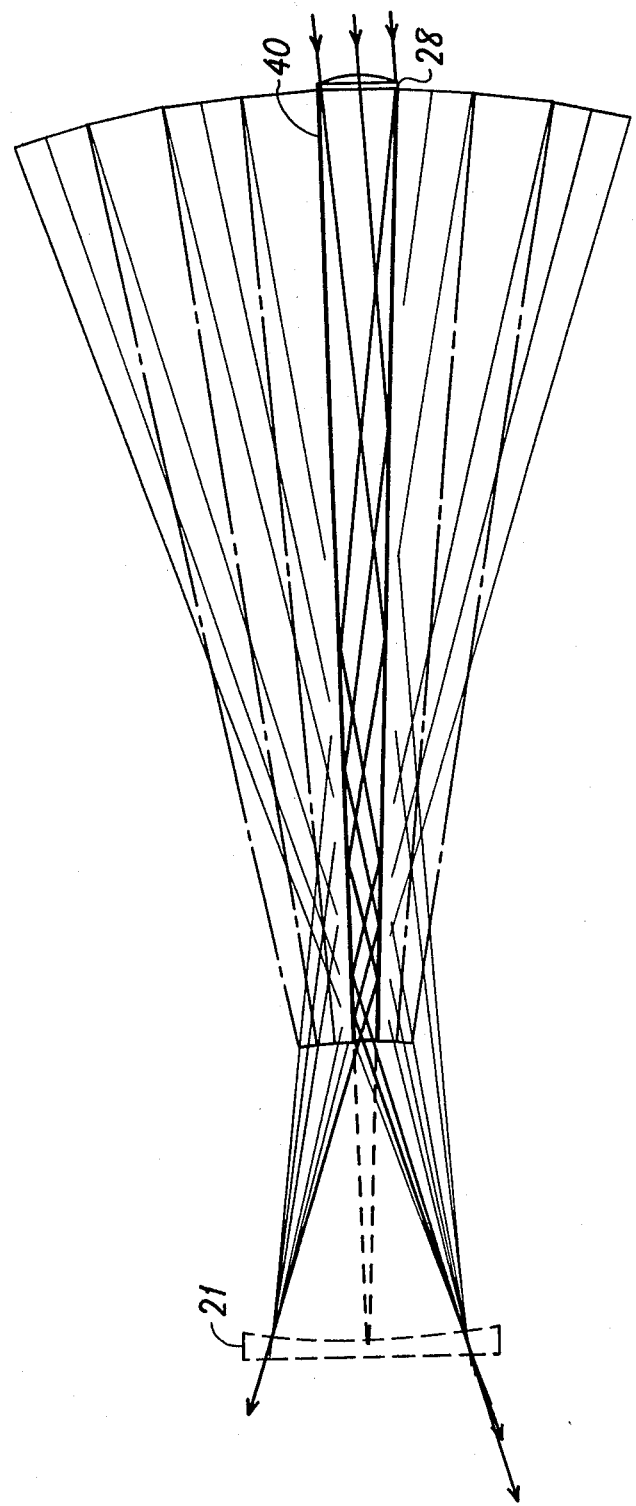
FIG. 5 is a ray trace through the light pipe/lens combination of the embodiment of FIG. 2.

FIG. 5 shows the application of the tapered light pipe/field lens combination to the spectrometer system of the present embodiment and traces three rays backwards from the lower edge of the object mirror 30. Using the polygon unfolding technique taught by Williamson in his aforementioned paper allows these reflected rays to be redrawn as a series of straight lines. Of course, this will include virtual rays (which have been indicated by thin solid lines) as well as real rays (heavier solid lines) which actually pass through the pipe. The ray trace clearly shows that with the source mirror 21 positioned at the vertex of the light pipe, the concentration of energy on that pupil is conjugate with symmetrically positioned points on the object mirror and hence that substantially all of the energy is transferred between the object mirror and the source mirror. Due to the scrambling effect, rays from that one point on the object mirror actually appear in this two-dimensional representation at two co-planar points on the source mirror, but all such rays (real and virtual) focus at those two points regardless of the number of reflections within the light pipe. Preserving pupil dimensions in this manner allows construction of the smallest mirror designs without loss of rays to the system by vignetting. On the other hand, if a small amount of vignetting is acceptable (see the system shown in FIG. 1), the source mirror can be placed closer to the small end of the tapered light pipe to further reduce the overall size of the instrument.

FIG. 5 also shows that the length of the light pipe can be changed, keeping the vertex and large end position unchanged and thus alter the small end beam focus size and the ratio of the f/#'s at the large and small ends.

Figure 6:
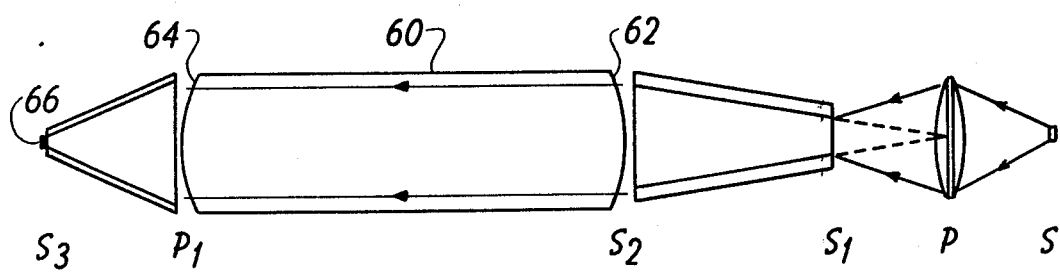
FIG. 6 is an optical schematic of the energy transfer system of FIG. 2 used in combination with a multiple internal reflection crystal.

Turning now to FIG. 6 there is shown the application of the energy transfer system of the present invention in combination with a multiple internal reflection (MIR) crystal 60 used to make attenuated total reflection measurements. The MIR crystal is of the same general construction as the type disclosed in U.S. Pat. No. 4,175,864 with the exception that the entrance face of the present crystal is made convex. The most compact light path through the crystal, and therefore the smallest crystal for a given etendue, is achieved if a source image is placed at one end of the crystal and a pupil at the other. This can be achieved by using a TLP in combination with an MIR crystal having a convex entrance face. The source mirror and exit slit are respectively the pupil P and source image $S_1$ in the small end section of the device while the entrance face 62 and the exit face 64 of the crystal are the source image $S_2$ and pupil $P_1$ within the large end section. Energy is transferred from the source to the exit face of the crystal and according to the principles discussed in detail above, the height of the beam exiting the crystal is controlled to enable energy to be transferred substantially without vignetting. Curving the exit face and placing an energy-collecting TLP of the type disclosed by Williamson permits efficient energy transfer to a detector 66 positioned at the end of this TLP.

It is apparent that the foregoing discussion concerning beam focus and pupil areas to match the etendue between different parts of an optical system can be also defined in terms of Lagrangians. Therefore it is possible to match optical systems having astigmatism to those that do not by using a tapered light pipe having a vertex in one plane which does not coincide with its vertex in the orthogonal plane.

It is believed that many of the advantages of the present energy transfer system over conventional lens systems have been demonstrated in the foregoing detailed description, for example:

1. An equivalent system requiring a minimum of three lenses, two of which are strong lenses, is reduced to one low power lens and a tapered light pipe.

2. Pupil dimensions are preserved thereby reducing sizes of components while at the same time eliminating undesirable vignetting.

3. The tapered light pipe/lens combination is more compact than the equivalent all-lens system and aids in the design of a portable instrument.

Other aspects, advantages and features of the present invention will be apparent to those of skill in the art. It will also be apparent that many other changes may be possible without departing from the spirit and scope of this invention. For example, throughout the foregoing, reference has only been made to tapered light pipes having hollow channels; however, the principles discussed above apply equally as well to tapered light pipes made of solid dielectric material and indeed may find application in the rapidly expanding field of fiber optics. Accordingly the foregoing detailed description is considered illustrative only and not to be limited except by the scope of the following claims.

I claim:

1. Apparatus for non-imaging energy transfer comprising:
   an extended source of optical energy;
   first and second sections spatially separated from one another between which said optical energy is to be transferred;
   means within each of said sections for defining an extended beam focus and associated pupil thereby establishing an f/# requirement therein, said first section having a small f/# requirement and said second section having a higher f/# requirement;
   a tapered light pipe positioned within the optical beam path between said sections with its small end positioned at the extended beam focus in said first section, with its large end positioned at the extended beam focus in said second section;
   focusing means positioned intermediate said large end and said second section pupil;
   said first section pupil being established at the vertex of said tapered light pipe by the combination of said focusing means and said light pipe such that the concentration of energy on said first section pupil is conjugate with symmetrically positioned points on said second section pupil and the product of the area of the extended beam focus and the solid angle of the beam respectively at each end of said light pipe is equal whereby energy is transferred between both of said pupils substantially without vignetting loss.

2. Apparatus as claimed in claim 1 wherein said beam focus and said pupil in said first section respectively are of similar shape to their counterparts in said second section but differ in cross-sectional area and separation.

3. Apparatus as claimed in claim 1 wherein said tapered light pipe includes wall means defining a hollow inner channel extending along the entire length of said pipe opening out at said large and small ends for passing optical energy therethrough.

4. Apparatus as claimed in claim 3 wherein said channel has a constant cross-sectional shape.

5. Apparatus as claimed in claim 4 wherein said shape is rectangular.

6. Apparatus as claimed in claim 3 wherein said wall means are gold coated to reduce reflection losses as said optical energy is passed through said pipe.

7. Apparatus as claimed in claim 1 wherein said focusing means is a field lens positioned at said large end.

8. Apparatus as claimed in claim 1 wherein said tapered light pipe is made of solid material.

9. For use with an infrared spectrometer of the type having an extended source of infrared energy, and an absorption cell with entrance and exit windows, said cell and said source forming distinct sections between which optical energy is to be transferred, each section including means for defining respective extended beam foci and associated pupils thereby establishing an f/# requirement within each section, the f/# requirements in said cell section differing from those in said source section, improved energy transfer apparatus comprising:
   a tapered light pipe positioned within the optical beam path between said source and said cell sections with its small end positioned at the extended beam focus in said source section, with its large end positioned at the extended beam focus in said cell;
   focusing means located between said large end and the pupil in said cell section;
   the pupil in said source section being established at the vertex of said tapered light pipe by the combination of said focusing means and said light pipe such that the concentration of energy on said source section pupil in conjugate with symmetrically positioned points on the pupil in said said cell section and the product of the area of the extended beam focus and the solid angle of the beam respectively at each end of said light pipe is equal whereby energy is transferred between both of said pupils substantially without vignetting loss.

10. Apparatus as claimed in claim 9 wherein the pupil in said cell section is an object mirror and the pupil in said source section is a source mirror.

11. Apparatus as claimed in claim 10 wherein said source mirror is positioned at the vertex of said light pipe.

12. Apparatus as claimed in claim 9 wherein said focusing means is a field lens positioned at the large end of said pipe.

13. Apparatus as claimed in claim 12 wherein said field lens is the entrance window of said cell and said large end of said pipe is directly adjacent said entrance window.

14. Apparatus as claimed in claim 9 wherein said light pipe includes a hollow inner chamber along its entire length opening out at both said large and small ends with the small end opening serving as the filter defining slit of the spectrometer.

15. In an internal reflection spectrometer of the type having in one section a multiple internal reflection crystal having respective light entrance and exit faces for making attenuated total reflection measurements after receiving optical energy from another section of the spectrometer at said light entrance face of said crystal, non-imaging energy transfer apparatus comprising:

means within each of said sections for defining an extended beam focus and associated pupil thereby establishing an f/# requirement therein, one of said sections having a high f/# requirement and the other of said sections having a smaller f/# requirement;

a tapered light pipe positioned within the optical beam path between said sections with its small end positioned at the extended beam focus in said other section, with its large end positioned at the extended beam focus in said one section;

focusing means positioned intermediate said large and and said one section pupil;

said other section pupil being established at the vertex of said tapered light pipe by the combination of said focusing means and said light pipe such that the concentration of energy on said other section pupil is conjugate with symmetrically positioned points on said one section pupil and the product of the area of the extended beam focus and the solid angle of the beam respectively at each end of said light pipe is equal whereby energy is transferred between both of said pupils substantially without vignetting loss.

16. Apparatus as claimed in claim 15 wherein said beam focus and said pupil in said one section respectively are of similar shape to their counterparts in said other section but differ in cross-sectional area and separation.

17. Apparatus as claimed in claim 15 wherein said other section includes as its pupil a source mirror which forms a beam focus in said other section, said light exit face being a pupil in said one section.

18. Apparatus as claimed in claim 17 wherein said light entrance face is positioned at said large end, said entrance face having a convex curvature and serving as said focusing means thereby matching said exit face pupil to said source mirror pupil.

19. Apparatus as claimed in claim 18 wherein said light exit face has a convex curvature for producing another beam focus in said one section.

20. A method for transferring energy between first and second spatially separated sections of an optical apparatus wherein each of said sections includes an extended beam focus and associated pupil for establishing both an f/# requirement and etendue within each section, the f/# requirements in each section being different but the etendues the same, said method comprising the steps of:

positioning a tapered light pipe within the optical beam path between said sections with the ends of said pipe positionally coinciding with the respective extended beam foci and with the projected vertex of said light pipe coinciding with the pupil adjacent the small end of the pipe;

forming a conjugate of the pupil located in said first section in said second section whereby energy is transferred between both of said pupils substantially without vignetting loss.

* * * * *